United States Patent [19]

Pechak

[11] Patent Number: 4,936,023
[45] Date of Patent: Jun. 26, 1990

[54] METHOD OF AND APPARATUS FOR MOUNTING A POSITION MEASURING DEVICE

[75] Inventor: Peter Pechak, Traunwalchen, Fed. Rep. of Germany

[73] Assignee: Dr. Johannes Heidenhain GmbH, Traunreut, Fed. Rep. of Germany

[21] Appl. No.: 181,328

[22] Filed: Apr. 13, 1988

[30] Foreign Application Priority Data

Apr. 23, 1987 [DE] Fed. Rep. of Germany ....... 3713548

[51] Int. Cl.$^5$ .............................................. G01B 11/04
[52] U.S. Cl. ...................................... 33/706; 33/613; 33/645; 33/655
[58] Field of Search ............ 33/125 R, 125 A, 125 M, 33/125 C, 613, 645, 655; 29/464, 465

[56] References Cited

U.S. PATENT DOCUMENTS

| | | | |
|---|---|---|---|
| 3,982,837 | 9/1976 | Cummins | 33/125 C |
| 4,330,935 | 5/1982 | Blair et al. | 33/645 |
| 4,549,353 | 10/1985 | Souji | 33/125 R |
| 4,569,137 | 2/1986 | Ichikawa | 33/125 R |
| 4,603,480 | 8/1986 | Sakagami | 33/125 R |

FOREIGN PATENT DOCUMENTS

| | | |
|---|---|---|
| 302003 | 12/1981 | Fed. Rep. of Germany . |
| 3437515 | 4/1986 | Fed. Rep. of Germany . |
| 2534016 | 4/1984 | France ................. 33/125 A |
| 2079943 | 1/1982 | United Kingdom ............. 33/125 A |

*Primary Examiner*—Allan N. Shoap
*Assistant Examiner*—Patrick R. Scanlon
*Attorney, Agent, or Firm*—Toren, McGeady & Associates

[57] ABSTRACT

A method of mountng a measuring device for measuring the relative positions of two objects, such as, the bed and the carriage of the machine, wherein a graduation of an embodiment of measure is scanned without contact by a scanning device. The embodiment of measure is initially aligned and mounted on the first of two objects. The scanning device is mounted on an auxiliary device and is exactly calibrated relative to the graduation of the embodiment of measure. The scanning device is displaced guided on the embodiment of measure by means of the auxiliary device until a stop surface of the second object is reached. The scanning device is fastened with the intermediate arrangement of an attachment device on the stop surface of the second object in such a way that the calibration of the scanning device relative to the graduation is maintained. The auxiliary device is then loosened and removed from the scanning device.

3 Claims, 2 Drawing Sheets

METHOD OF AND APPARATUS FOR MOUNTING A POSITION MEASURING DEVICE

BACKGROUND OF THE INVENTION

1. Field of the Invention

The present invention relates to a method of mounting a measuring device for measuring the relative positions of two objects, such as, the bed and the carriage of a machine, wherein a graduation of an embodiment of measure is scanned without contact by a scanning device. The invention also relates to an apparatus for carrying out the method.

2. Description of the Prior Art

In known methods of the above-described type, machines, for example, machine tools, are equipped with position measuring devices which make it possible to digitally read as a position measurement value the position of the carriage relative to the bed of the machine, or to supply the measurement values to a numeric control and to use them in the control in the known manner for controlling the machine.

The machines as well as the position measuring devices have tolerances which may lead to errors which, in the final analysis, are considered machine errors. To be able to determine the resulting total error, the machine manufacturer measures the finished machine tools provided with position measuring devices by means of a comparative measuring system having an equally high accuracy.

Interferometric measuring devices are suitable for this purpose. Also suitable are measuring devices which operate in accordance with the grid scanning method if they have an accuracy which is at least one order of magnitude higher than the measuring device with which the machine to be measured is equipped.

The deviations determined by the comparative measuring device can be further processed in various different ways. However, the compensation of this deviation is not subject matter of this application and is already discussed in many prior publications, so that this compensation is not discussed herein.

It is, therefore, the primary object of the present invention to provide a method of the above-described type which makes it possible to mount a correspondingly accurate position measuring device with sufficient accuracy on a machine to be measured.

SUMMARY OF THE INVENTION

In accordance with the method of the present invention, initially the embodiment of measure is aligned and mounted on the first of the two objects. The scanning device is mounted on an auxiliary device and is exactly calibrated relative to the graduation of the embodiment of measure. The scanning device is displaced guided on the embodiment of measure by means of the auxiliary device until a stop surface of the second of the two objects is reached. The scanning device is fastened with the intermediate arrangement of an attachment device on the stop surface of the second object in such a way that the calibration of the scanning device relative to the graduation is maintained. The auxiliary device is then loosened and removed from the scanning device.

The method according to the present invention provides the particular advantage that a complicated calibration of the scanning device on the machine is not required and that a position measuring device can be used which does not require its own guide means for the scanning device.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
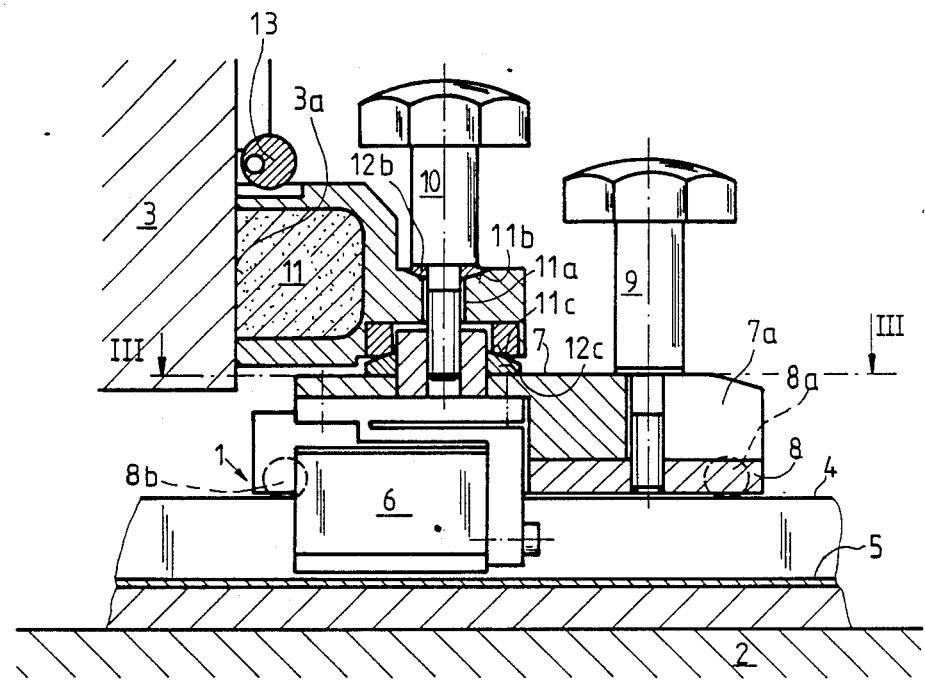
FIG. 1 is a partial view, partly in section, of a position measuring device in the assembly stage.

FIG. 1 of the drawing shows the assembly stage in which a position measuring device 1 is just mounted on a machine tool to be measured. An embodiment of measure 4 having a known graduation 5 is aligned and fastened on bed 2 of the machine tool.

The position of a tool carriage 3 relative to bed 2 of the machine is to be measured. This measurement is to be a comparative measurement or a calibration measurement at the machine 2 which is equipped with another measuring system, not shown. For this reason, the position measuring device 1 to be mounted in accordance with the present invention must meet specific requirements. The graduation 5 must have a very high accuracy and the scanning of the graduation by means of a scanning device must be very precise. For this reason, the scanning device 6 cannot have its own guide means on the embodiment of measure 4 because this would mean that a coupling would be required as a connecting element between the scanning device 6 and the tool carriage 3. This coupling would cause inaccuracies, especially reversing errors.

Accordingly, scanning of the graduation 5 must be without contact. However, in the case of a contact-free scanning, the guidance of the scanning device 6 poses problems. It is particularly difficult in mobile measuring devices as they are used for comparative measurements or calibrations, to provide a highly error-free coupling of the scanning device 6 relative to the embodiment of measurement because the mounting conditions differ significantly from machine to machine.

Figure 2:
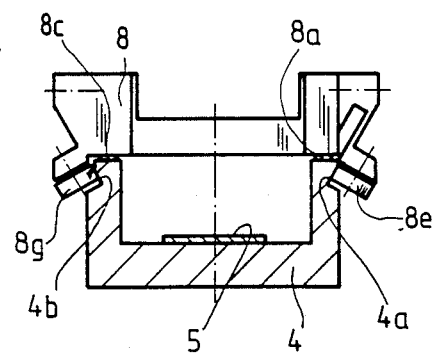
FIG. 2 is a side view, partly in section, of a detail of the device of FIG. 1.
Figure 3:
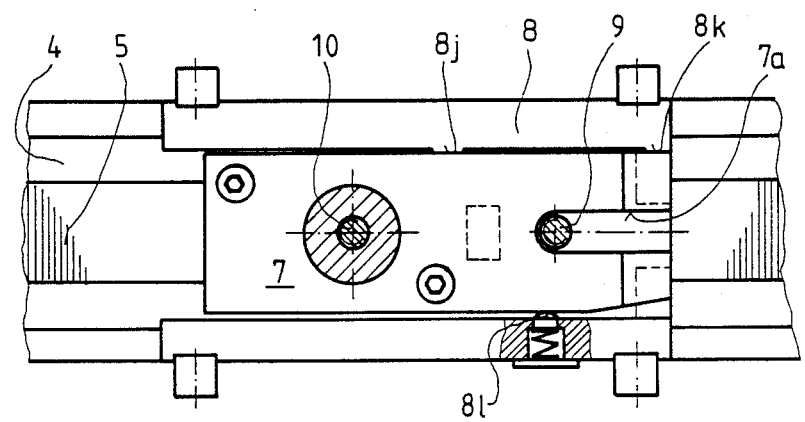
FIG. 3 is a sectional view taken along sectional line III—III of FIG. 1.
Figure 4:
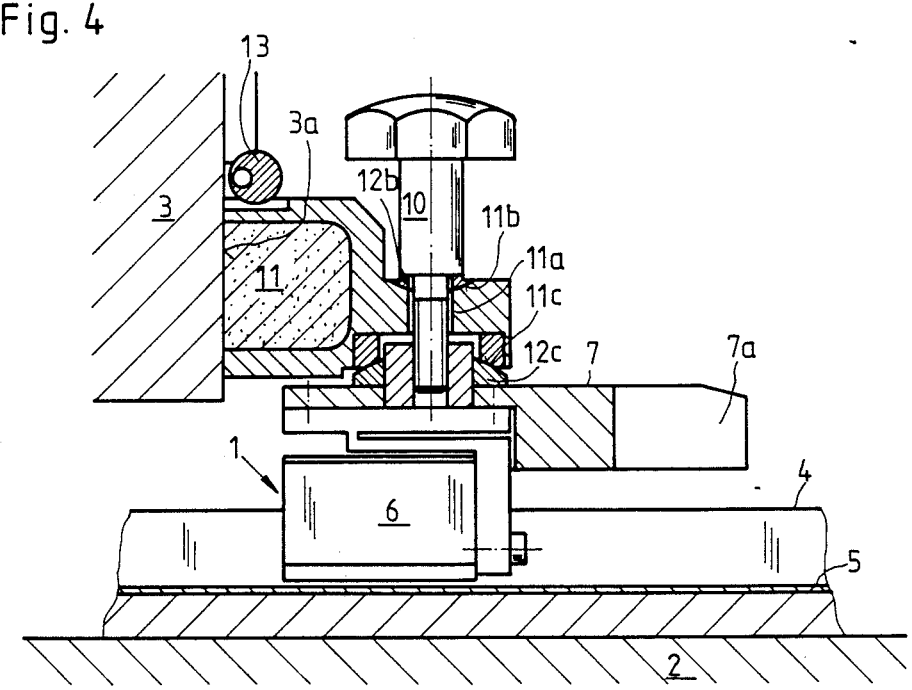
FIG. 4 is a partial view of a mounted position measuring device.

Starting from the stage illustrated in FIG. 1, the assembly of the measuring device 1 shall be described with the aid of FIGS. 2 to 4.

The scanning device 6 is fastened through an intermediate plate 7 to an auxiliary carriage 8 by means of a clamping screw. The clamping screw 9 extends through a longitudinal slot 7a in the intermediate plate 7 and releasably connects the intermediate plate 7 to the auxiliary carriage 8. A clamping screw 10 which engages the intermediate plate 7 with the scanning device 6 serves to fix a magnetic holder 11. The magnetic holder 11 has a bore 11a for the clamping screw 10. In the region of the bore 11a, the magnetic holder 11 has spherical indentations 11b and 11c for spherical washers 12b and 12c. When the clamping screw 10 is loosened, the magnetic holder 11 can be turned and tilted within certain limits. The resulting angular mobility of the magnetic holder 11 is necessary, so that the position of the magnetic holder 11 can be adapted to a stop surface 3a of the tool carriage 3.

FIG. 2 of the drawing schematically illustrates the auxiliary carriage 8 on the embodiment of measure 4. The auxiliary carriage 8 runs on four ball bearings 8a, 8b, 8c, 8d, wherein one of the ball bearings is adjustable in a manner which is not illustrated. The auxiliary carriage 8 is guided laterally on the embodiment of measure 4 by means of four additional ball bearings 8e, 8f, 8g, 8h, two of which are rigidly fastened and the other two are resiliently fastened on the auxiliary carriage 8. The auxiliary carriage 8 is secured against lifting out by providing the four ball bearings 8e, 8f, 8g, 8n and the corresponding guide tracks 4a, 4b in inclined positions.

FIG. 3 of the drawing is a sectional view taken along sectional line III—III of FIG. 1 and shows the manner of inserting the intermediate plate 7 in the auxiliary carriage 8. The scanning device 6 which in FIG. 3 is not visible behind intermediate plate 7 is fastened to the intermediate plate 7 in such a way that it is exactly aligned with respect to the graduation 5. Auxiliary carriage 8 has contact surfaces 8j and 8k for the intermediate plate 7 and a third spring-biased contact means 8l which ensures that the intermediate plate 7, and thus, the scanning device 6, always assume a defined position within the auxiliary carriage 8. Since the auxiliary carriage 8 is guided precisely on the embodiment of measure 4, a precise guidance of the scanning device 6 relative to the graduation 5 is also ensured and a safe reading of the graduation 5 is effected.

After the embodiment of measure 4 has been aligned and fastened as shown in FIG. 1 on the bed 2 of the machine tool, the above-described unit composed of scanning device 6, intermediate plate 7 and auxiliary carriage 8 is placed against the guide tracks 4a and 4b of the embodiment of measure 4. The scanning device 6 which is precisely guided by the embodiment of measure 4 is moved by means of the auxiliary carriage 8 until the magnetic holder 11 securely rests against the stop face 3a of the tool carriage 3. It is not necessary that the contact surface 3a assumes a correct position relative to the scanning device 6 because the magnetic holder 11 can rest exactly against the stop surface 3a when the clamping screw 10 is in the loosened position. The magnetic holder 11 is aligned by means of the spherical washers 12b and 12c in the spherical indentations 11b and 11c relative to the stop surface 3a and is fixed in this position by means of clamping screw 10. The scanning device is now securely connected to the tool carriage 3 with the scanning device 6 being a precisely determined scanning position.

The clamping screw 9, and thus, the connection between the scanning device 6 and the auxiliary carriage 8 are now loosened. The auxiliary carriage 8 is removed and the position measuring device 1 is now securely mounted on the machine to be measured, so that the comparative measurements can be carried out.

In order to ensure that even the smallest influences of external forces on the scanning device 6 are avoided, a cable with a small magnet, not shown, fastened to the magnet by means of a cable clip, can be attached to the stop surface 3a. This creates a type of tension release.

FIG. 4 of the drawing shows the position measuring device 1 in the measuring position, i.e., without the auxiliary carriage 8.

After the comparative measurements have been carried out, the auxiliary carriage 8 is again placed through intermediate plate 7 into a rigid connection with the scanning device 6. The clamping screw 9 is securely tightened and, subsequently, the clamping screw 10 is loosened in order to release the connection between the scanning device 6 and the tool carriage 3. To be able to separate the magnetic holder 11 from the stop surface 3a, a cam member 13 is provided on the magnetic holder 11 which can be used to force the magnetic holder 11 away from the top surface 3a of the tool carriage 3.

While a specific embodiment of the invention has been shown and described in detail to illustrate the application of the inventive principles, it will be understood that the invention may be embodied otherwise without departing from such principles.

I Claim

1. In a method of mounting a measuring device for measuring the relative positions of a first object and a second object, wherein a graduation of an embodiment of measure is scanned without contact by a scanning device, the improvement comprising:
    (a) aligning and mounting the embodiment of measure on the first object;
    (b) mounting the scanning device on an auxiliary device and exactly calibrating the scanning device relative to the graduation of the embodiment of measure;
    (c) displacing the scanning device guided on the embodiment of measure by means of the auxiliary device until a stop surface of the second object is reached;
    (d) fastening the scanning device by means of an attachment device onto the stop surface of the second object, so that the calibration of the scanning device relative to the graduation is maintained; and
    (e) loosening and removing the auxiliary device from the scanning device.

2. An arrangement for measuring the relative positions of a first object and a second object, comprising an embodiment of measure including a graduation, the embodiment of measure adapted to be fastened on the first object, a scanning device for scanning without contact the graduation of the embodiment of measure, an auxiliary carriage and an intermediate plate, the scanning device being connected to the auxiliary carriage through the intermediate plate, the auxiliary carriage being releasable and removable from the scanning device for effecting the scanning without contact, the scanning device being movable by means of the auxiliary carriage against a stop surface of the second object, and means including an attachment device for fastening the scanning device to the stop surface of the second object, so that a calibration of the scanning device relative to the graduation is maintained, the attachment device being swivelable about a joint, the attachment device including a clamping screw for tightening the attachment device relative to the intermediate plate, wherein the attachment device is a magnetic holder, and wherein the joint for the magnetic holder is formed by spherical indentations defined in the attachment device and spherical washers placed in the spherical indentations of the attachment device.

3. The arrangement according to claim 2, wherein the auxiliary carriage includes ball bearings and the embodiment of measure includes guide tracks, the auxiliary carriage being supported on the guide tracks of the embodiment of measure by means of the ball bearings.

* * * * *